(12) United States Patent
Davies

(10) Patent No.: US 9,143,794 B2
(45) Date of Patent: Sep. 22, 2015

(54) PICTURE ENCODING AND DECODING

(75) Inventor: Thomas James Davies, Surrey (GB)

(73) Assignee: British Broadcasting Corporation, London (GB)

( * ) Notice: Subject to any disclaimer, the term of this patent is extended or adjusted under 35 U.S.C. 154(b) by 938 days.

(21) Appl. No.: 12/953,992

(22) Filed: Nov. 24, 2010

(65) Prior Publication Data

US 2011/0293196 A1    Dec. 1, 2011

(30) Foreign Application Priority Data

Nov. 27, 2009  (GB) .................................. 0920818.2

(51) Int. Cl.
| | |
|---|---|
| *H04N 19/436* | (2014.01) |
| *H04N 19/159* | (2014.01) |
| *H04N 19/176* | (2014.01) |
| *H04N 19/117* | (2014.01) |
| *H04N 19/12* | (2014.01) |
| *H04N 19/124* | (2014.01) |
| *H04N 19/18* | (2014.01) |
| *H04N 19/46* | (2014.01) |
| *H04N 19/61* | (2014.01) |

(52) U.S. Cl.
CPC ........... *H04N 19/436* (2014.11); *H04N 19/117* (2014.11); *H04N 19/12* (2014.11); *H04N 19/124* (2014.11); *H04N 19/159* (2014.11); *H04N 19/176* (2014.11); *H04N 19/18* (2014.11); *H04N 19/46* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 2005/0013359 A1* | 1/2005 | Srinivasan | 375/240.03 |
| 2006/0133682 A1* | 6/2006 | Tu et al. | 382/248 |
| 2006/0133684 A1* | 6/2006 | Srinivasan et al. | 382/250 |
| 2007/0036225 A1* | 2/2007 | Srinivasan et al. | 375/240.18 |
| 2007/0196025 A1* | 8/2007 | Tran et al. | 382/250 |
| 2008/0075377 A1* | 3/2008 | Topiwala et al. | 382/248 |

FOREIGN PATENT DOCUMENTS

EP    1672929 A2    6/2006

OTHER PUBLICATIONS

Robert, A.—"Improving Intra mode coding in H.264/AVC through block oriented transforms"—2006 IEEE, pp. 382-386.*

* cited by examiner

*Primary Examiner* — Bernard Krasnic
(74) *Attorney, Agent, or Firm* — Christensen O'Connor Johnson Kindness PLLC

(57) ABSTRACT

Video is encoded by applying a vertically and horizontally separable transform to provide a block of transform coefficients; and quantizing the transform coefficients. Prior to quantization, a filtering operation is performed on the block of transform coefficients, the filtering operation applying a rotation to pairs of coefficients in the block. Each pair of coefficients may be symmetrically positioned with respect to the leading diagonal of the block.

16 Claims, 3 Drawing Sheets

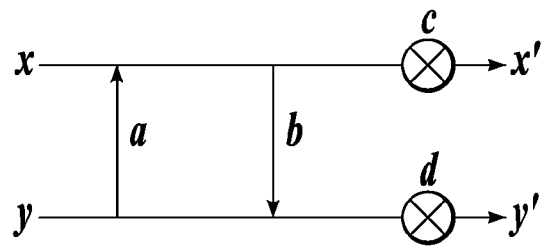
Fig.3.
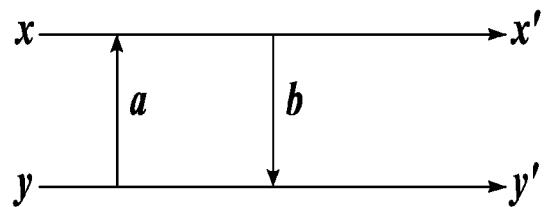
Fig.4.
| $x_0$ | $x_1$ | $x_2$ | $x_3$ | $x_4$ | $x_5$ | $x_6$ | $x_7$ |
|---|---|---|---|---|---|---|---|
×
| $a_0$ | $a_1$ | $a_2$ | $a_3$ | $a_4$ | $a_5$ | $a_6$ | $a_7$ |
|---|---|---|---|---|---|---|---|
+
| $y_0$ | $y_1$ | $y_2$ | $y_3$ | $y_4$ | $y_5$ | $y_6$ | $y_7$ |
|---|---|---|---|---|---|---|---|
Fig.5.

PICTURE ENCODING AND DECODING

BACKGROUND OF THE INVENTION

The present invention relates to picture encoding and decoding. In an important example the pictures form part of a video sequence.

It has long been understood that in lossless encoding, use of a transform such as the Direct Cosine Transform (DCT) can be very effective in permitting coarser quantization of higher spatial frequencies that are less perceptible. The DCT (including approximations and variations) has important advantages. It can be applied separable in horizontal and vertical directions; for this and other reasons it is computationally efficient. Mathematically, it is understood that the DCT (or other separable transforms) falls short of optimum coding efficiency. The Karhunen-Loeve transform (KLT) is often referred to as the optimum transform for coding a signal but the complexity is such that its use in most fields of encoding is wholly impractical.

It would be helpful to improve the efficiency of, for example, the DCT in the context of picture encoding or decoding.

SUMMARY OF THE INVENTION

Accordingly the present invention consists in one aspect in method of encoding a picture block, comprising the steps of applying a vertically and horizontally separable transform to provide a block of transform coefficients; and quantising the transform coefficients; wherein a filtering operation is performed on the block of transform coefficients prior to quantization, the filtering operation comprising the identification of one or more pairs of coefficients in the block and applying a rotation or approximate rotation to the or each pair of coefficients. In a typical case, each pair of coefficients consists of coefficients symmetrically positioned with respect to the leading diagonal of the block.

There exists of course an analogous decoding process.

The DCT can be regarded as a limiting case of the KLT. The present inventor has recognised that by rotating one or more pairs of coefficients in the block of transform coefficients, a set of other KLTs can be produced which—or some of which—are better optimised for picture signals. The rotation can however be performed at a relatively low computing overhead.

For further computational efficiency, the filtering operation may consist of lifting steps, whereby each coefficient in each pair is modified in turn by the addition or subtraction of a multiple or approximate multiple of the other coefficient in the pair, together with scaling operations, whereby the magnitude of the coefficients is adjusted by a suitable constant factor. This scaling may be performed within the quantisation step.

It will be understood that, for example, in ITU-T H264, intra coded blocks employ a spatial predictor with a set of available prediction modes. Most of these modes can be regarded as defining an angle of spatial prediction.

In a preferred form of the present invention, this angle is used as the rotational angle for the transform coefficients or—more generally—the prediction mode is used to determine the rotational angle or angles. It is found that this approach generally selects from the mentioned set of KLTs, a particular KLT which is better optimised for coding efficiency for that block than the DCT itself. For certain picture material, for example picture material including features not parallel to either of the horizontal or vertical dimensions, the increase in coding efficiency can be highly significant. This approach has the benefit that no signalling is required of the detail of the filtering operation from the encoder to the decoder.

Other techniques can be employed for selecting rotation angles and signalling if necessary.

In another aspect, the present invention consists in a method of encoding a picture comprising a number of picture blocks, comprising the steps of applying a spatial predictor to at least some of the blocks, that spatial predictor having a spatial direction; applying a vertically and horizontally separable transform to each block to provide a block of transform coefficients; applying a filtering operation on the block of transform coefficients for each spatially predicted block, the filtering operation varying with said spatial direction; and quantising the transform coefficients.

In still another aspect, the present invention consists in picture block encoding apparatus comprising a transform element serving to apply to an input picture block a vertically and horizontally separable transform to provide a block of transform coefficients; a filter network comprising a parallel array of filters; a block demultiplexer operating on the block of transform coefficients to provide a different pair of coefficients to each filter, the respective filters applying filtering operations in parallel upon the respective pairs of coefficients; and a quantiser operating on the filtered transform coefficients.

There exists of course analogous bitstream decoding apparatus.

BRIEF DESCRIPTION OF THE DRAWINGS

The invention will now be described by way of example with reference to the accompanying drawings, in which

FIG. 3 illustrates a lifting implementation of a rotation operator with scaling;

FIG. 4 illustrates a lifting implementation of a rotation operator without scaling;

FIG. 5 illustrates parallel implementation of the lifting steps; and

DETAILED DESCRIPTION OF PREFERRED EMBODIMENTS OF THE INVENTION

Figure 1:
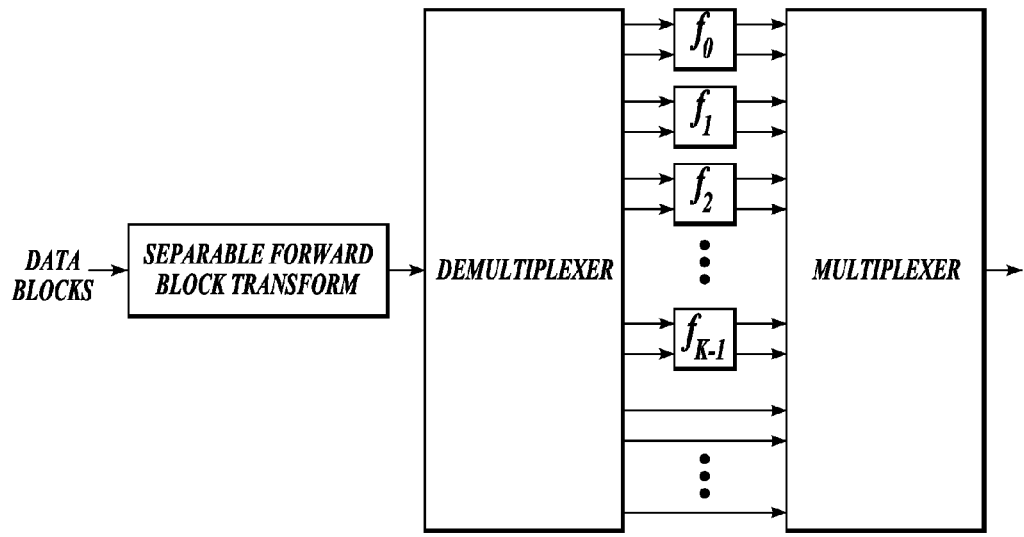
FIG. 1 illustrates an architecture for use in an encoder.
Figure 2:
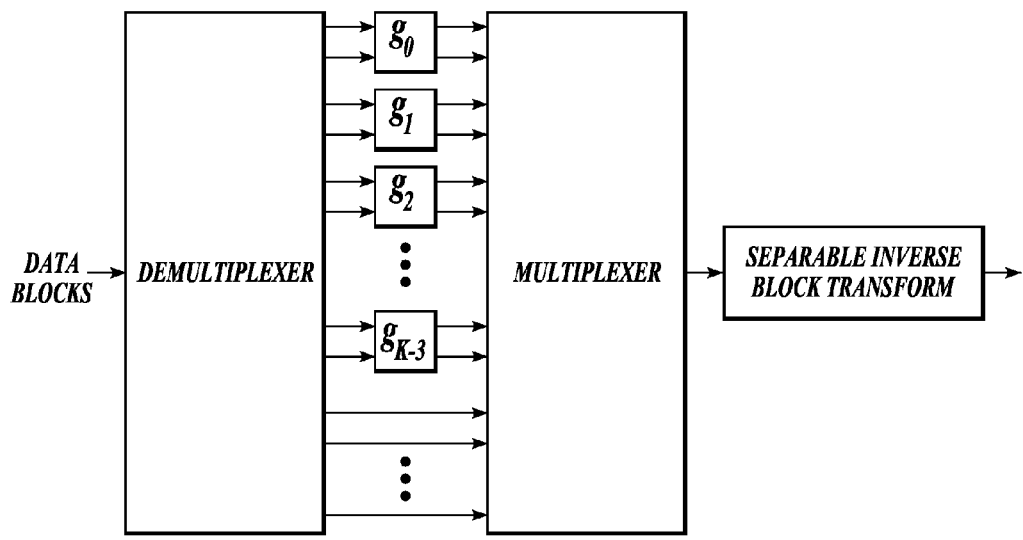
FIG. 2 illustrates an architecture for use in a decoder.

The architecture of the new transforms is shown in FIGS. 1 and 2. The forward transform consists of two stages. The first stage is a conventional separable transform, normally a DCT or approximate DCT (as in H264). For more information on H264 the reader is directed to the library and the website of the International Telecommunications Union and for example to: www.itu.int/rec/T-REC-H.264.

The second stage consists of a demultiplexer, which decomposes a block into its constituent coefficients, a filter bank of invertible matrix filters $f_i$ (encoder) and $g_i = f^{-1}_i$ (decoder), each operating on a pair of coefficients, and a multiplexer recombining the coefficients.

Given a square block of coefficients $C_i$ each elementary filter operation operates on a pair $C_{i,j}$ and $C_{j,i}$ where $i \neq j$ of coefficients, corresponding to complementary spatial frequencies.

Each elementary operation is a rotation (or approximation to a rotation), i.e. there are angles $\alpha_k$ such that $f_k = R(\alpha_k)$ and the new coefficients $C'_{i,j}$ and $C'^{i}_j$ are given by:

$$\begin{pmatrix} C'_{i,j} \\ C'_{j,i} \end{pmatrix} = f_k(C_{i,j}, C_{j,i}) = R(\alpha_k) \begin{pmatrix} C_{i,j} \\ C_{j,i} \end{pmatrix} = \begin{pmatrix} \cos\alpha_k & \sin\alpha_k \\ \sin\alpha_k & -\cos\alpha_k \end{pmatrix} \begin{pmatrix} C_{i,j} \\ C_{j,i} \end{pmatrix}$$

Typically the angles of rotation will satisfy: $-\pi/4 < \alpha_k \leq \pi/4$ so the predominant orientation of each coefficient will remain the same. A rotation matrix $R(\alpha)$ can be factored as follows:

$$R(\alpha) = \begin{pmatrix} \cos\alpha & \sin\alpha \\ \sin\alpha & -\cos\alpha \end{pmatrix}$$

$$= \begin{pmatrix} \cos\alpha & 0 \\ 0 & -\frac{1}{\cos\alpha} \end{pmatrix} \begin{pmatrix} 1 & 0 \\ -\sin\alpha\cos\alpha & 1 \end{pmatrix} \begin{pmatrix} 1 & \tan\alpha \\ 0 & 1 \end{pmatrix}$$

A similar factorisation where the order of upper and lower triangular matrices may also be constructed.

As a result each elementary operation $f_k$ or $g_k$ can have the lifting architecture of FIG. 3 (scaled operation) or 4 (unscaled operation) for values of a, b, c and d. In unscaled operation, the scaling factors may be absorbed into a subsequent quantisation matrix for encoding purposes, and into an inverse quantisation matrix for decoding. Such a quantisation matrix would also take into account any coefficient scaling required for the separable transform, which would be necessary, for example, if the H264 transform were used. The unscaled lifting operations are exactly invertible by reversing the order of the operations and changing the sign of the multipliers a and b.

Often in coding applications a transform consisting entirely of integer operations is required. This achieves several ends: there is a bit-exact specification, so there is no drift between encoder and decoder; lossless coding is possible when there is no quantisation; and transforms may be significantly speeded up on many hardware and software architectures.

A floating point lifting operation of the form:

$$x\mathrel{+}=\lambda y$$

may be approximated to d bits by the recipe:

$$x\mathrel{+}=r*y\!>\!>\!d$$

or, more accurately, by $$x\mathrel{+}=(r*y+(1\!<\!<\!(d-1)))\!>\!>\!d$$

where $>>$ and $<<$ represent a bitshift to the right or left respectively. This operation is exactly reversible by changing the sign.

Each rotation in the transform is applied independently to disjoint pairs of coefficients and so all the rotations may be performed in parallel. In software this may be achieved by the use of parallel instruction sets such as MMX and SIMD on x86 platforms, or similar. For example, to perform 8 rotations on 8 pairs of 16 bit coefficients, one half of each coefficient pair may be packed into a 128 bit word, and the other half of each pair into a second word. A third word would contain multiplicative factors for each lifting step packed similarly. A simultaneous lifting step can be effected by first using a suitable parallel instruction to multiply one coefficient word element by element with the lifting factor word, and second using another suitable instruction to add the result to the other coefficient word (FIG. 5). Similar methods can be applied to both floating point and integer lifting steps.

A variety of techniques are available for identifying which pairs of coefficients are to be filtered and for selecting the rotation or other filter operation. Depending on the circumstance, signaling to the decoder will likely be required and the overhead that this imparts will be taken into consideration in assessing the improvement in coding efficiency.

A particularly preferred approach will now be described.

It will be understood that in H264, if a block is encoded in intra mode, a prediction block is formed based on previously encoded and reconstructed blocks. This prediction block P is subtracted from the current block prior to encoding. For the luminance (luma) samples, P may be formed for each 4×4 subblock or for a 16×16 macroblock. There are a total of 9 optional prediction modes for each 4×4 luma block; 4 optional modes for a 16×16 luma block; and one mode that is always applied to each 4×4 chroma block.

Figure 6:
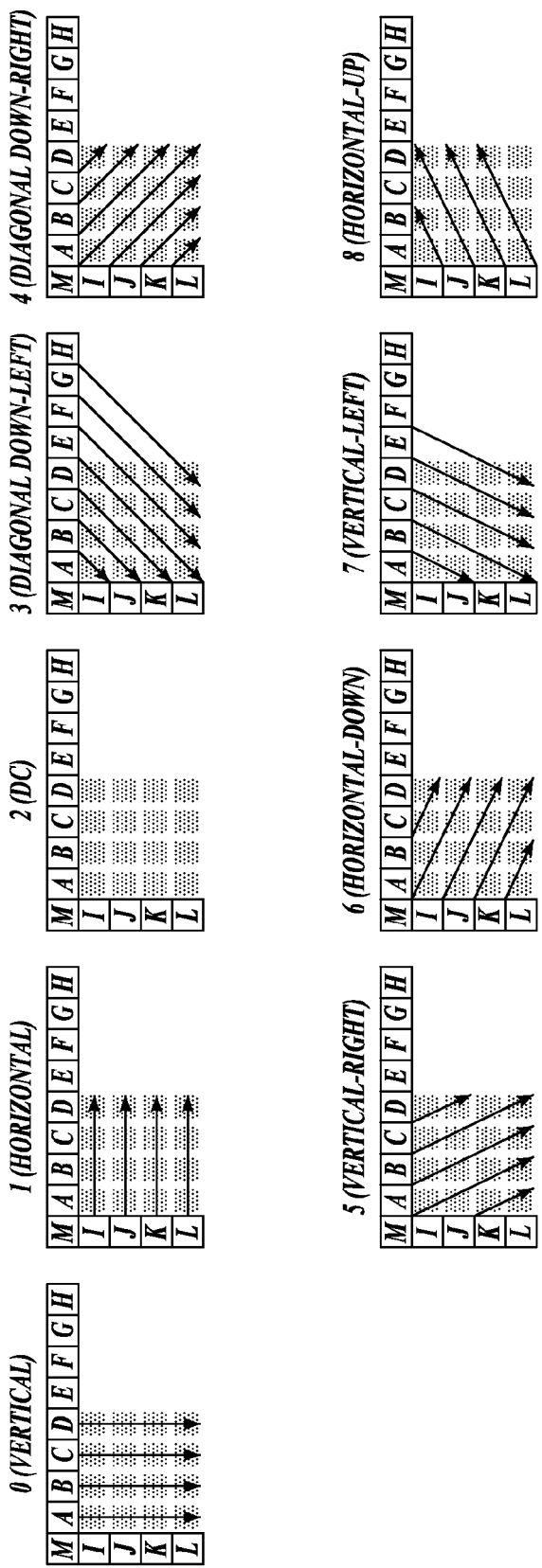
FIG. 6 illustrates directions in known spatial predictors.

The arrows in FIG. 6 indicate the direction of prediction in each mode. For modes 3-8, the predicted samples are formed from a weighted average of the prediction samples A-Q. The encoder may select the prediction mode for each block that minimizes the residual between P and the block to be encoded.

The direction of prediction employed for a block may, in this preferred form of the present invention be used us the rotation angle for all non-diagonal coefficients in the block. More generally, the filtering operation performed as shown in FIG. 1 (for encoding) may be selected block by block, in accordance with the prediction mode. Depending on the mode, there may be no filtering, filtering on some but not all of the coefficients or filtering of all (non-diagonal) coefficients. Across a block, the filtering may vary in a pattern which is pre-selected for that mode.

Still further variations will occur to the skilled reader.

It will be understood that encoding and decoding steps can be provided in specialized hardware or in appropriately programmed processors. As has been described, encoding can be conducted so to enable decoding with no further interrelationship between the encoder and the decoder beyond the normal form of the bitstream. In variations, performance can be improved by permitting the encoder to signal to the decoder, usually through the bitstream.

The invention claimed is:

1. A method of encoding a picture block in processing apparatus, comprising the steps of:
    applying a vertically and horizontally separable transform to provide a block of transform coefficients, wherein the separable transform is selected from the group consisting of: the Discrete Cosine Transform, the Discrete Sine Transform; and
    quantising the transform coefficients;
    wherein a filtering operation is performed on the block of transform coefficients prior to quantisation, the filtering operation comprising identifying one or more pairs of coefficients in the block and applying a rotation or approximate rotation to the or each pair of coefficients;
    wherein the rotation or approximate rotation varies from one block of transform coefficients to another block of transform coefficients:
    wherein the filtering operation consists of lifting steps, whereby each coefficient in each pair is modified in turn by addition or subtraction of a multiple or approximate multiple of the other coefficient in the pair, together with scaling operations, whereby a magnitude of the coefficients is adjusted by a suitable constant factor;
    in which each lifting stage is of a form $$x+(ry+2^{d-1})\!>\!>\!d$$

or $$x\mathrel{+}=(ry)\gg d$$

where x, y are coefficients, r is any integer and d is a non-negative integer and the operation >> d comprises bit shifting down by d bits.

2. The method according to claim 1, wherein each pair of coefficients consists of coefficients symmetrically positioned with respect to a leading diagonal of the block.

3. The method according to claim 1, wherein a first lifting step of modifying the first coefficient in the pair is performed simultaneously for all identified coefficient pairs and wherein a second lifting step of modifying the second coefficient in the pair is performed simultaneously for all identified coefficient pairs.

4. The method according to claim 1, wherein said scaling is performed within the quantisation step.

5. The method according to claim 1, further comprising the step of selecting a rotation angle for each block such that each coefficient pair in a block is rotated by a same common angle for the block.

6. The method according to claim 5, in which each picture block has undergone a spatial prediction utilising a directional predictor having an angle and the rotation angle is selected in accordance with the angle of the directional predictor for that block.

7. The method according to claim 1, wherein the rotation or approximate rotation applied to the or each pair of coefficients is signalled in an encoded output.

8. The method according to claim 1, wherein the identifying of one or more pairs of coefficients in the block comprises identifying some but not all off-diagonal coefficients.

9. A method of decoding a bitstream representative of a picture block, comprising the steps of:
   inverse quantising to provide a block of transform coefficients; and
   applying a vertically and horizontally separable inverse transform to provide a picture block, wherein the separable transform is selected from the group consisting of: the Discrete Cosine Transform, the Discrete Sine Transform;
   wherein a filtering operation is performed on the block of transform coefficients prior to said inverse transform, the filtering operation comprising identifying one or more pairs of coefficients in the block and applying a rotation or approximate rotation to the or each pair of coefficients,
   wherein the rotation or approximate rotation varies from one block of transform coefficients to another block of transform coefficients;
   wherein the filtering operation consists of lifting steps, whereby each coefficient in each pair is modified in turn by addition or subtraction of a multiple or approximate multiple of the other coefficient in the pair, together with scaling operations, whereby a magnitude of the coefficients is adjusted by a suitable constant factor;
   in which each lifting stage is of a form $$x\mathrel{+}(ry+2^{d-1})\gg d$$

or $$x\mathrel{+}=(ry)\gg d$$

where x, y are coefficients, r is any integer and d is a non-negative integer and the operation >> d comprises bit shifting down by d bits.

10. The method according to claim 9, wherein each pair of coefficients consists of coefficients symmetrically positioned with respect to a leading diagonal of the block.

11. The method according to claim 9, wherein a first lifting step of modifying the first coefficient in the pair is performed simultaneously for all identified coefficient pairs and wherein a second lifting step of modifying the second coefficient in the pair is performed simultaneously for all identified coefficient pairs.

12. The method according to claim 9, wherein said scaling is performed within the inverse quantisation step.

13. The method according to claim 9, further comprising the step of selecting a rotation angle for each block such that each coefficient pair in a block is rotated by a same common angle for the block.

14. The method according to claim 13, in which each picture block has undergone a spatial prediction utilising a directional predictor having an angle and the rotation angle is selected in accordance with the angle of the directional predictor for that block.

15. The method according to claim 9, wherein the rotation or approximate rotation applied to the or each pair of coefficients is signalled in an encoded output.

16. The method according to claim 9, wherein the identifying of one or more pairs of coefficients in the block comprises identifying some but not all off-diagonal coefficients.

* * * * *